United States Patent
Oko et al.

(10) Patent No.: US 6,358,639 B2
(45) Date of Patent: *Mar. 19, 2002

(54) METHODS AND KITS FOR DECONTAMINATING FUEL CELLS

(75) Inventors: Uriel M. Oko, Glenmont; Nicholas Childs, Troy, both of NY (US)

(73) Assignee: Plug Power LLC, Latham, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/384,640

(22) Filed: Aug. 27, 1999

(51) Int. Cl.$^7$ ................................................. H01M 8/04
(52) U.S. Cl. ............................. 429/17; 429/19; 429/34; 429/12
(58) Field of Search ............................... 429/17, 19, 13, 429/34, 12, 39, 38

(56) References Cited

U.S. PATENT DOCUMENTS

| | | | | | |
|---|---|---|---|---|---|
| 5,747,185 A | * | 5/1998 | Hsu | ............................. | 429/44 |
| 5,786,104 A | * | 7/1998 | Black et al. | ................... | 429/13 |
| 5,824,199 A | * | 10/1998 | Simmons et al. | ........... | 204/262 |
| 5,954,937 A | * | 9/1999 | Farmer | ....................... | 205/687 |
| 6,018,471 A | * | 1/2000 | Titus et al. | ................. | 363/126 |
| 6,126,723 A | * | 10/2000 | Drost et al. | ....................... | 96/4 |

* cited by examiner

Primary Examiner—Stephen Kalafut
Assistant Examiner—R. Alejandro
(74) Attorney, Agent, or Firm—Fish & Richardson P.C.

(57) ABSTRACT

Methods and kits for removing contaminants from fuel cells are disclosed. The methods include passing a removal substance through a flow channel in the cell, where the substance is selected to remove the contaminant. The contaminants can be, e.g., metallic ions or organic compounds, and the removal substance can be, e.g., acidic or alkaline solutions, chelating agents, or oxidants.

22 Claims, 5 Drawing Sheets

METHODS AND KITS FOR DECONTAMINATING FUEL CELLS

BACKGROUND OF THE INVENTION

The invention relates to fuel cells.

Fuel cells are devices that convert chemical energy stored in a fuel into electrical energy by combining the fuel with an oxidant. In most commercial fuel cells, a hydrogen fuel is oxidized to generate an electric current, and then combined with oxygen to form water.

A typical fuel cell includes two electrodes, an anode and a cathode, separated by an electrolyte. Diatomic hydrogen molecules are provided to the anode, while an oxygen source (usually ambient air) is provided to the cathode. At the anode, electrons are stripped from the hydrogen molecules by an oxidation reaction and diverted, producing an electric current that can be used to perform useful work. The hydrogen ions that result from the oxidation reaction travel through the electrolyte and react with reduced oxygen molecules, forming water. The chemical reactions that occur at the anode and cathode can be described by the following two equations:

$$2H_2 \rightarrow 4H^+ + 4e^- \text{ at the anode, and}$$

$$O_2 + 4H^+ + 4e^- \rightarrow 2H_2O \text{ at the cathode.}$$

The oxidation reaction at the anode is typically assisted by a catalyst, such as platinum.

In most existing fuel cell systems, the hydrogen molecules provided to the anode are derived from fossil fuels, such as natural gas, in a process called reformation. In the reformation process, a fossil fuel is combined with water at high temperatures to produce a "reformate." If the fossil fuel is natural gas (which is mostly methane), then the primary reformation reaction will be:

$$CH_4 + 2H_2O + heat \rightarrow CO_2 + 4H_2$$

In addition to producing carbon dioxide and hydrogen, however, the reformation process also produces carbon monoxide by the following competing reaction:

$$CH_4 + H_2O + heat \rightarrow CO + 3H_2$$

Before delivering the reformate to the anode, the amount of carbon monoxide in the reformate can be reduced by a shift converter, which combines carbon monoxide with water to form carbon dioxide and additional hydrogen:

$$CO + H_2O \rightarrow CO_2 + H_2.$$

For fossil fuels that include larger hydrocarbons, the reformation process may also include pyrolysis, or "thermal cracking."

Fuel cells are usually classified by the type of electrolyte used to separate the anode from the cathode. One common type of fuel cell is the proton exchange membrane (PEM) cell, in which the electrolyte is a thin, solid polymer matrix that is permeable to hydrogen ions but poses at least a partial barrier to the hydrogen fuel. A typical PEM cell includes an anode side flow plate, a cathode side flow plate, two gas diffusion layers (GDLs) disposed between the flow plates, and a membrane-electrode assembly (MEA) between the GDLs. The MEA includes the membrane and a catalyst, e.g., platinum. The catalyst can be formed, for example, as part of a slurry that bonds the GDLs to the membrane, or as an ink-slurry added separately to the membrane. The GDLs can be made, for example, from carbon cloth.

Since each fuel cell typically generates a relatively small voltage (e.g., less than 1 volt), cells are often combined in series to form a fuel cell stack. A fuel cell stack typically includes MEAs placed between distribution flow plates, and manifolds connecting the flow plates. The hydrogen source (e.g., the reformate) and the oxygen source (e.g., ambient air) are fed into a manifold supply passage, and distributed to the electrodes by the flow plates. Water produced by the fuel cells can be drained through a manifold discharge passageway.

Both fuel cells and fuel cell stack structures are described in greater detail in Meacher et al., U.S. Pat. No. 5,858,569, which is incorporated herein by reference.

SUMMARY OF THE INVENTION

In general, in one aspect, the invention features a method of removing a contaminant from a fuel cell. The method includes passing a removal substance through a flow channel in the cell, where the substance is selected to remove the contaminant.

Embodiments of this aspect of the invention may include one or more of the following features. The substance is selected to remove a metallic ion, $SO_x$, $NO_x$, or an organic molecule. If the contaminant is a metallic ion, the substance can be, e.g., an acidic solution or a chelating agent. If the contaminant is an organic molecule, then the substance can be an oxidant, such as an organic solvent, a peroxide, ozone, or ozonated water. If the contaminant is $SO_x$, then the substance can be, e.g., an alkaline solution. The substance can be either a gas or a liquid.

The substance can be passed through the flow channel by passing the substance into a flow inlet, where the flow inlet connects to the flow channel. The substance can then pass through the flow channel and exit through a flow outlet. If the fuel cell has a plurality of flow channels, where each channel has a flow inlet and a flow outlet, the method can include passing the substance through each flow inlet.

In another aspect, the invention features a method of identifying contaminants present in a fuel cell that has a flow inlet, a flow outlet, and a flow channel that connects the inlet to the outlet. The method includes: (a) passing a wash solution, e.g., water or a water-acetone solution, into the inlet such that it passes through the flow channel; and (b) analyzing the wash solution after it exits the flow outlet, using, e.g., chromatography, mass spectrometry, or chemical analysis, to identify contaminants present in the cell.

In another aspect, the invention features a method of decontaminating a fuel cell that has a flow inlet, a flow outlet, and a flow channel that connects the inlet to the outlet. The method includes: (a) passing a wash solution into the inlet such that it passes through the flow channel; (b) analyzing the wash solution after it exits the outlet to identify a contaminant present in the cell; (c) selecting a removal substance targeted to remove the contaminant; and (d) flushing the removal substance through the flow channel.

Embodiments of this aspect of the invention may include one or more of the following features. The method can further include passing a second wash solution into the inlet such that it passes through the flow channel after completion of the flushing step, and then analyzing the second wash solution after it exits the outlet to determine if the flushing step removed the contaminant. The analyzing step can include identifying a plurality of contaminants present in the fuel cell, the selecting step can includes selecting a plurality of removal substances targeted to remove the respective contaminants, and the flushing step can include flushing the plurality of removal substances through the flow channel in succession.

In addition, the method can further include selecting a second removal substance targeted to remove the contaminant and flushing the second removal substance through the flow channel.

In another aspect, the invention features a method of decontaminating a fuel cell stack that has a fuel entrance, a fuel delivery manifold, and a discharge manifold. The method includes: (a) passing a wash solution into the fuel entrance such that it passes through the fuel delivery manifold, into fuel cells within the fuel cell stack, and out the discharge manifold; (b) analyzing the wash solution after it exits the discharge manifold to identify a contaminant present in the stack; (c) selecting a removal substance targeted to remove the contaminant; and (d) passing the removal substance into the fuel entrance.

Embodiments of this aspect of the invention may include one or more of the following features. The removal substance can be a liquid, and the passing step can include flushing a volume of the liquid into the fuel entrance, where the liquid volume is greater than an amount of space within the stack available for liquid. If the cell includes an oxygen delivery manifold, then the method can further include passing the removal substance into an oxygen entrance.

In another aspect, the invention features a kit for decontaminating a fuel cell stack. The kit includes an element for identifying a contaminant in the stack, and a removal substance targeted to remove the contaminant when the substance is flushed through the stack.

Embodiments of this aspect of the invention may include one or more of the following features. The element can identify a plurality of contaminants in the stack, and the kit can include a plurality of removal substances targeted to remove the respective contaminants when flushed through the stack. The element can include a chromatography device.

As used herein, the term "inlet" or "flow inlet" means any orifice capable of admitting a gas or fluid to a flow channel.

Embodiments of the invention may include one or more of the following advantages. Embodiments of the methods and kits allow removal of a variety of contaminants from fuel cells.

The methods and kits can enhance performance of a fuel cell or a fuel cell stack.

The removal substances and wash solutions are generally inexpensive and easily obtainable.

Other embodiments and advantages will be apparent from the following description and from the claims.

DESCRIPTION OF THE PREFERRED EMBODIMENTS

The invention relates to recognizing that fuel cells and fuel cell stacks can become contaminated by impurities in the hydrogen and oxygen sources provided to the cells and to methods of identifying and removing those contaminants from fuel cells.

Delivery of Fuel and Oxygen to Fuel Cells

Figure 1:
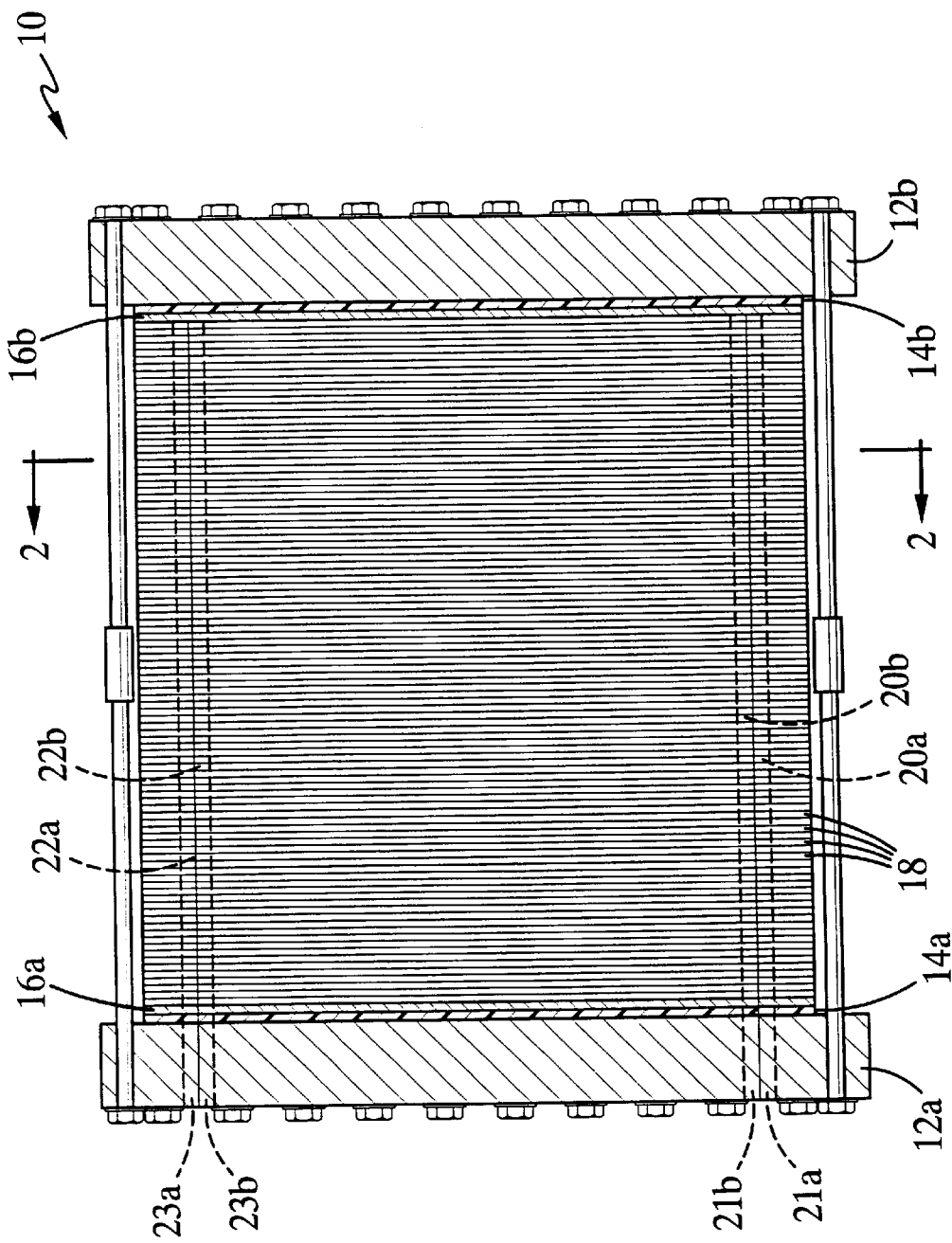
FIG. 1 is a sectional view of a fuel cell stack.

Referring to FIG. 1, a fuel cell stack 10 includes end plates 12a and 12b, insulation layers 14a and 14b, current collector plates 16a and 16b, and multiple PEM fuel cells 18. Fuel manifold 20a delivers fuel to the anodes of cells 18, and oxygen manifold 20b delivers ambient air to the cathodes of the cells. Unused fuel, unused air, and other discharge exits stack 10 through discharge manifolds 22a and 22b. Manifolds 20a and 20b have entrances 21a and 21b, respectively, and discharge manifolds 22a, 22b have exits 23a, 23b, respectively.

Figure 2:
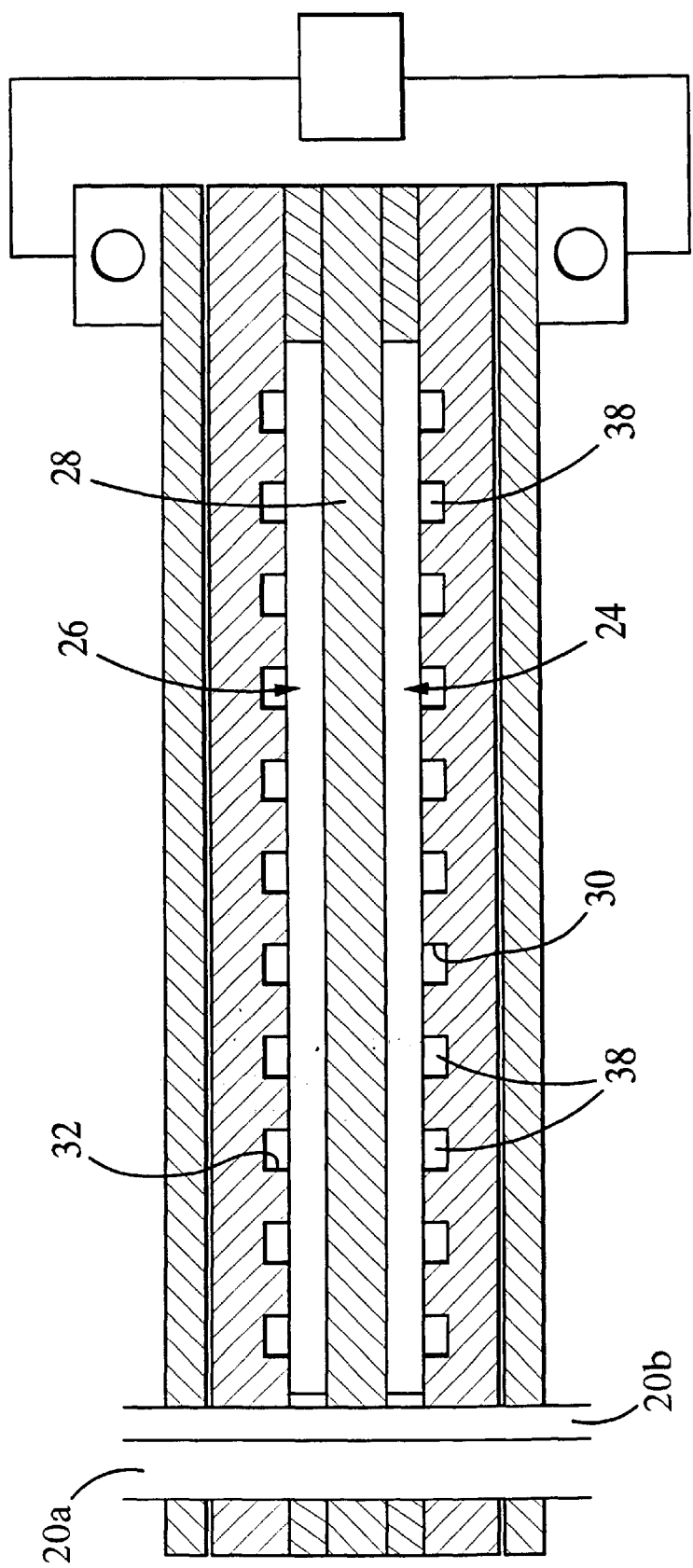
FIG. 2 is a sectional view of an individual fuel cell within the stack of FIG. 1, taken along the line 2—2 in FIG. 1.

Referring to FIG. 2, each PEM fuel cell 18 includes an anode gas diffusion layer (GDL) 24, a cathode GDL 26, and a semi-permeable polymer membrane 28 between the GDLS. An anode side flow plate 30 is located adjacent anode GDL 24, and a cathode side flow plate 32 is located adjacent cathode GDL 26.

Figure 3:
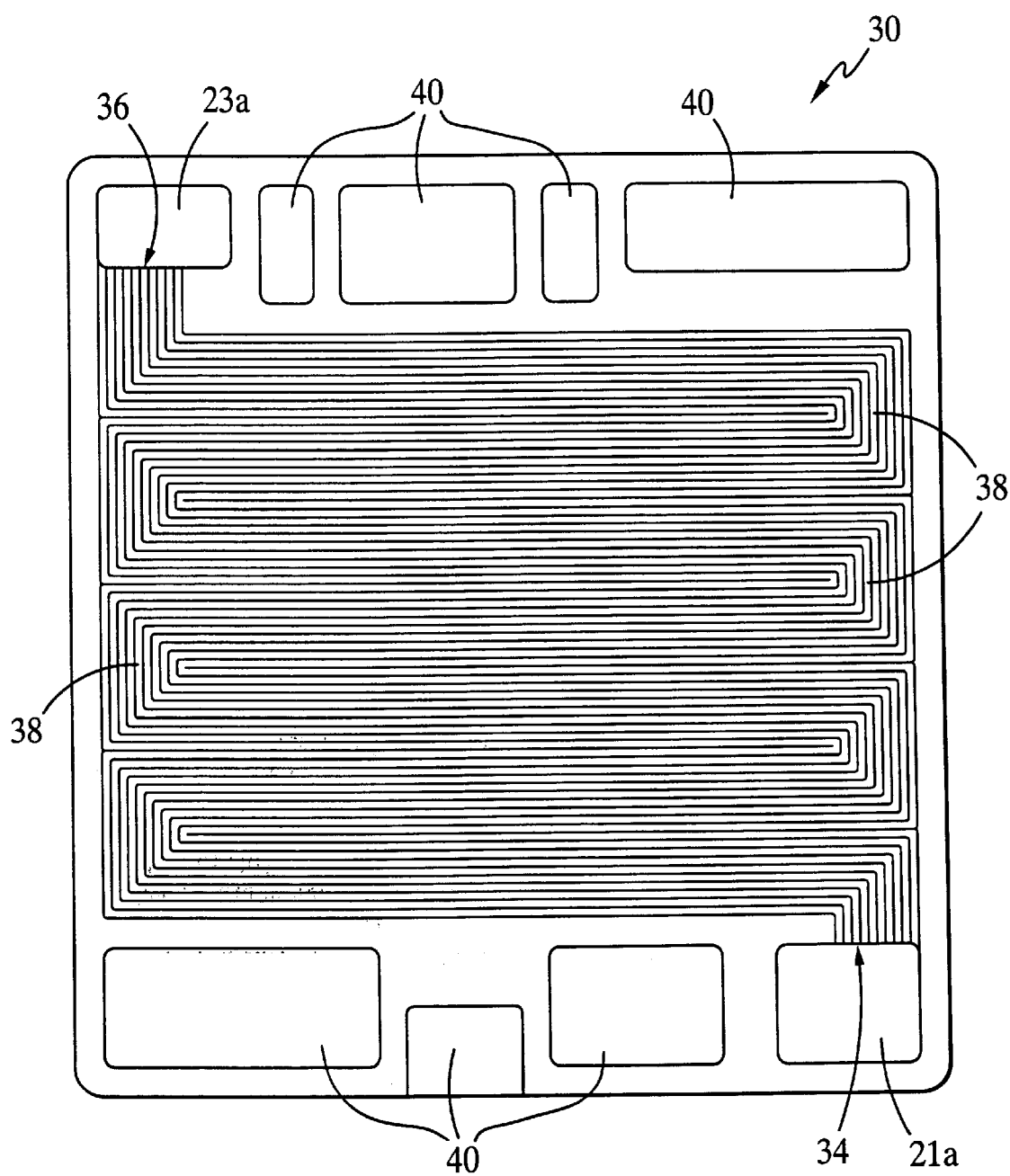
FIG. 3 is a plan view of an exterior face of a flow plate of the cell of FIG. 2.

Referring to FIG. 3, anode side flow plate 30 includes multiple inlets 34, multiple outlets 36, and multiple serpentine flow channels 38 connecting the inlets to the outlets. Inlets 34 connect to fuel manifold 20a, and outlets 36 connect to a discharge manifold, e.g., manifold 23a. Alternatively, the flow plate can have a single inlet, a single outlet, and a single flow channel. Flow plate 30 also includes various peripheral holes 40 which when aligned with identical holes in other plates in the stack form manifolds. For example, at least one hole 40 supplies ambient air to cathode side flow plate 32. Cathode side flow plate 32 has a structure similar to anode side plate 30 for distributing that air to cathode GDL 26.

In operation, fuel is passed into manifold 20a through entrance 21a. The fuel enters anode side flow plates 30 of cells 18 through inlets 34, and travels through serpentine channels 38, where it is distributed to the anode GDLs 24. Discharge fuel exits through outlets 36 into manifold 23a. Similarly, air is pumped into manifold 20b through entrance 21b, where it is delivered to the cathode GDLs 26 via cathode side flow plates 12. Discharge air exits through manifold 23b.

Fuel Cell Contamination

Over time, fuel cells can become contaminated by compounds in the ambient air delivered to the cell cathodes, or by impurities in the hydrogen fuel (e.g., the reformate) provided to the anodes. Contaminants can also be introduced by water injected into the fuel or air stream for hydration purposes, or by water injected directly into the flow plates. The contaminants accumulate, for example, in the manifolds, in the serpentine channels 38 of the flow plates, or within the MEAs.

Ambient air is composed primarily of nitrogen, oxygen, argon, carbon dioxide, and neon, but also comprises a number of other compounds and pollutants. Some of the molecules and pollutants normally found in ambient air that can accumulate in fuel cell stacks include nitrous oxides ($NO_x$), sulfur oxides ($SO_x$), hydrocarbons, and complex organic molecules, such as benzene and polycyclic aromatic hydrocarbons. Ambient air also includes particulates, such as silicate dust, sulfate salts, NaCl, smoke particulates, and pieces of soil, which can also accumulate in the cell stack.

For fuel cell stacks located inside of buildings, common indoor air pollutants can also accumulate in the cells. Indoor air pollutants include benzene, various volatile organic compounds, m-p-dichlorobenzene, m-p-xylene, and components of tobacco smoke, such as $NO_2$ and hydrogen sulfide. In factories, industrial solvents such as trichloroethylene could also potentially accumulate in cells.

The reformate fuel delivered to the anodes may also contain impurities that can accumulate in fuel cells and interfere with performance. For example, fossil fuels contain small amounts of metallic ions, such as iron, calcium, magnesium, aluminum, nickel, and cobalt. The reformate stream will likely also contain products of reactions other than the desired reformation reactions. For example, as noted above, the reformation process produces some carbon monoxide in addition to the carbon dioxide and hydrogen. If certain catalysts are present (e.g., iron or cobalt), some of this carbon monoxide will react with hydrogen in a Fischer-Tropsch process. Products of the Fischer-Tropsch process include methane, liquid hydrocarbons, waxes, and alcohols. These Fischer-Tropsch products will be delivered with the reformate stream to the anode, and can accumulate in the fuel cells.

Iron Contamination Experiment

Iron damages PEM cells by catalyzing fluoride degradation in the centers of the polymer membranes. Without fluoride in the membrane, the membrane is no longer able to effectively pass hydrogen.

The effect of iron contamination on PEM fuel cell performance was measured in the following experiment. Four separate fuel cells (cell #1 through cell #4) were first contaminated with different amounts of iron. To introduce the iron, the MEAs were dipped in boiling $Fe^{2+}$/water solutions having iron concentrations ranging from 62.5 ppm to 1000 ppm for ten minutes, and then placed between flow plates. To prevent $Fe^{3+}$ precipitation, the solutions were acidified to a pH of 2.8 with $H_2SO_4$. The cells each had areas of 50 $cm^2$ cells, and used 3% Nafion Toray paper gas diffusion layers. Cell #5, the control, contained no iron.

After contaminating cells 1–4 with iron, the cells were operated at 0.2 volts, at a temperature of 75° C. and a pressure of 1.5 psig. The humidified hydrogen delivery rate to the anodes was 0.6 standard liters per minute, and the humidified air delivery rate to the cathodes was 1.8 standard liters per minute. Since the MEAs were operated at a temperature lower than the fuel and ambient air passed into the cells, water condensed on the anode and cathode side flow plates. The condensation passed through the serpentine channels 38 of the flow plates, at times passing into the gas diffusion layers, and then exited the flow plates through outlets 36.

To measure the effect of the iron on fluoride degradation, water discharge from the anode and cathode side flow plates was periodically collected, and the fluoride content of the discharge was measured. The total fluoride collected from the anode and cathode side flow plates during the 20 hour experiment for each of the four cells is summarized in Table 1 below. Table 1 also shows the current generated by each contaminated cell at the beginning of the experiment.

TABLE 1

| Cell | $Fe^{+2}$ Content (by weight) | Anode Side Fluoride Loss (g/hr/cm$^2$) | Cathode Side Fluoride Loss (g/hr/cm$^2$) | Current (amps) |
| --- | --- | --- | --- | --- |
| #1 | 0.1% | N/A (cell not functional) | N/A | 1.15 |
| #2 | 0.025% | 105 × 10$^{-8}$ | 57 × 10$^{-8}$ | 18.07 |
| #3 | 0.0125% | 65 × 10$^{-8}$ | 145 × 10$^{-8}$ | 18.29 |
| #4 | 0.00625% | 80 × 10$^{-8}$ | 80 × 10$^{-8}$ | 22.87 |
| #5 | 0 | 35 × 10$^{-8}$ | 35 × 10$^{-8}$ | 28.69 |

These data show that iron contamination accelerates fluoride loss and reduces the current generated by a PEM cell.

Figure 4:
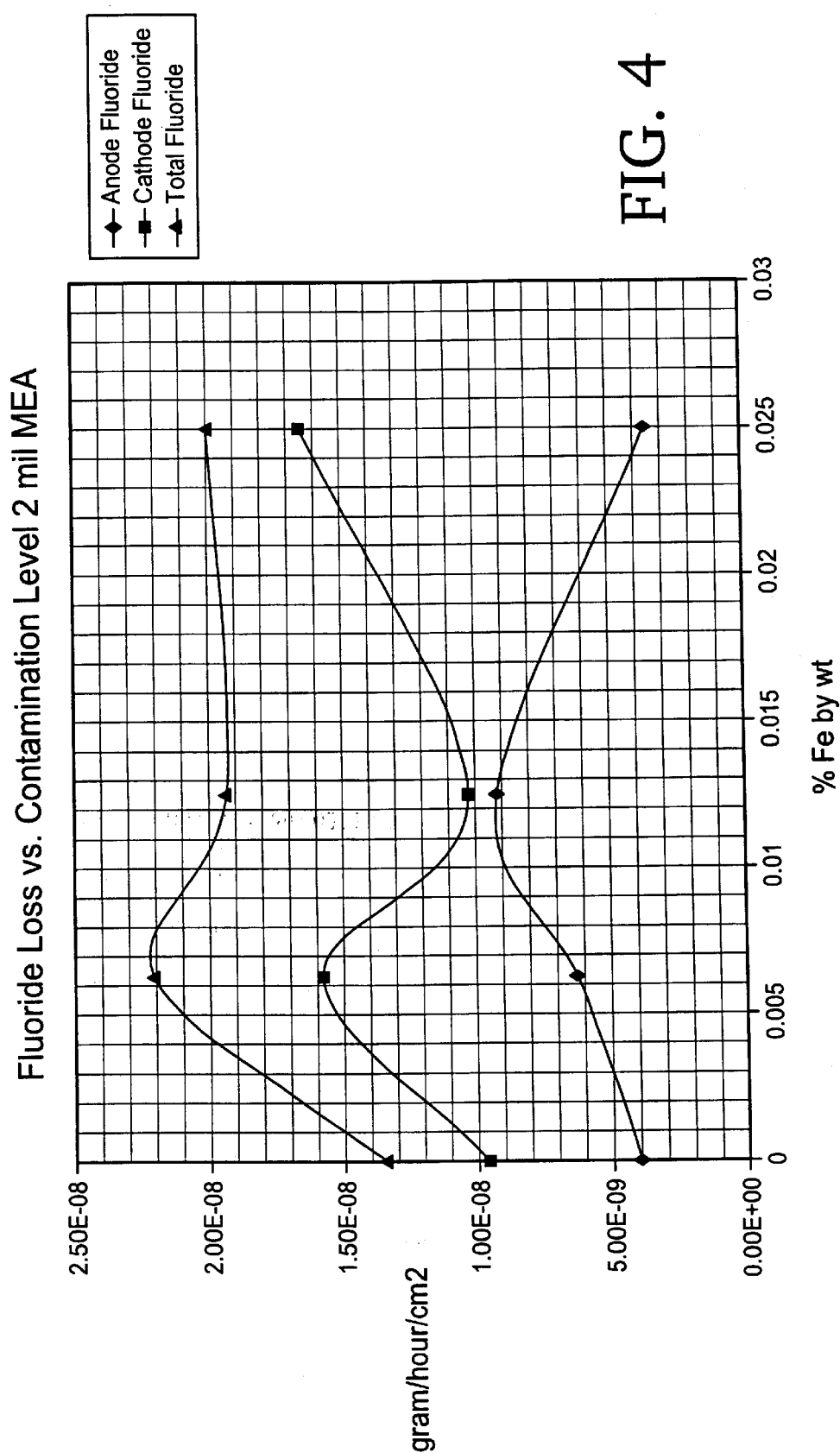
FIG. 4 is a graph illustrating the effect of iron contamination on PEM fuel cell performance.

FIG. 4 is a graph showing fluoride loss rate versus iron concentration for the experiment. In FIG. 4, separate plots depict fluoride loss from the anode side, fluoride loss from the cathode side, and total fluoride loss.

Figure 5:
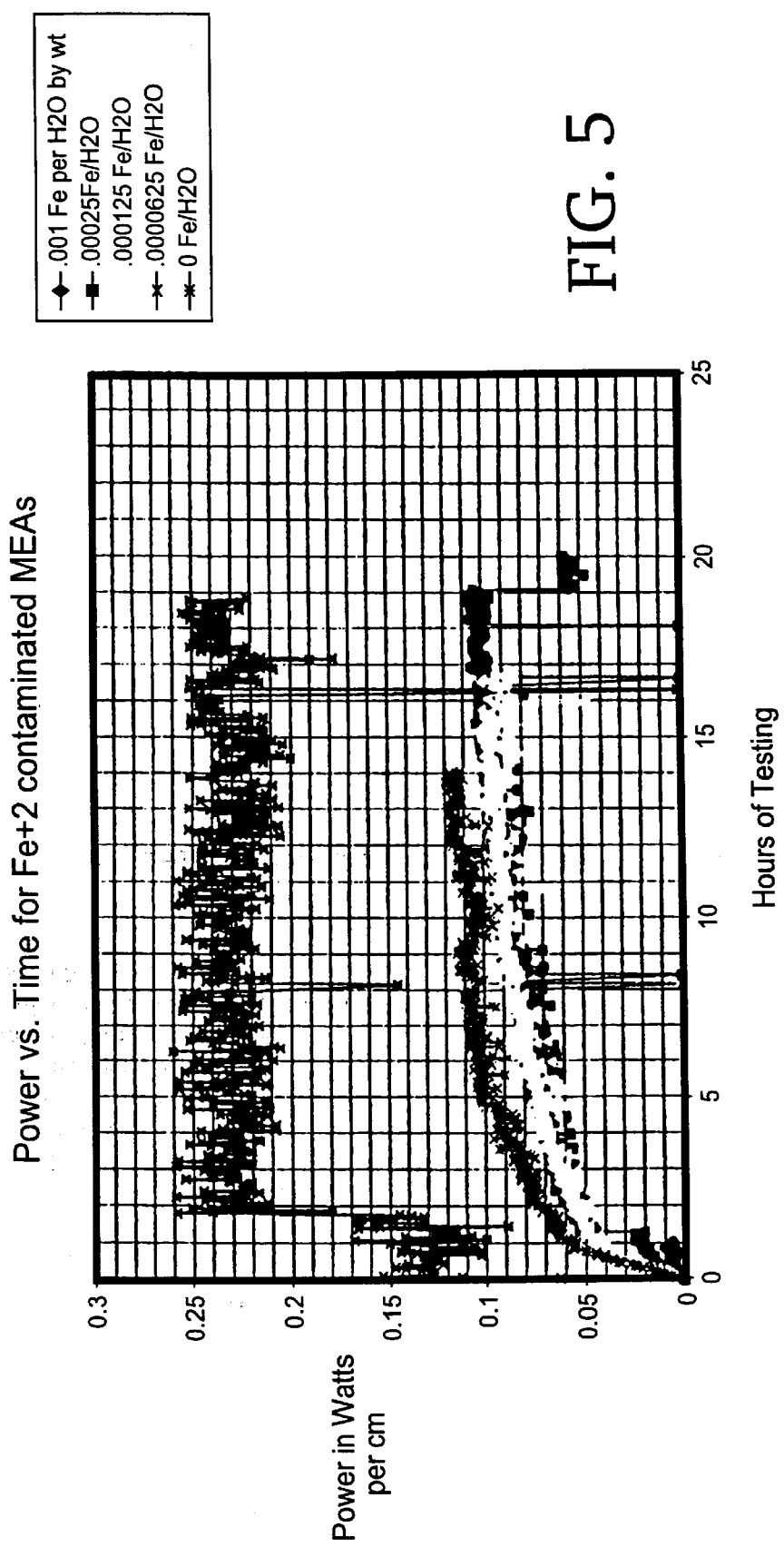
FIG. 5 is a graph illustrating recovery of iron contaminated fuel cells.

The experiment also demonstrates that iron contaminated cells can recover. In FIG. 5, the power of the cells (current times the operating voltage) is graphed versus time. As shown in FIG. 5, the power generated by the contaminated cells increases steadily for the first 7–8 hours. In contrast, the control, cell #5, generates steady power after the second hour. (The poor performance of cell #5 during the first two hours is likely due to initial clogging of a gas diffusion layer. At about 2.0 hours, the layer apparently unclogged, and the cell began performing normally.)

It appears that the steady recovery of the four contaminated cells is due to removal of iron by water that condensed and passed through the flow plates. The experiment suggests, therefore, that contaminated cells will recover if the contaminant is removed.

Methods of Decontaminating Fuel Cells

In embodiments of the invention, accumulated contaminants are removed from fuel cells by flushing various removal substances through a fuel cell stack or through individual fuel cells. Particular flushing solutions and gasses are selected to remove certain categories of contaminants.

Metallic contaminants, such as iron, magnesium, calcium, aluminum, cobalt, and nickel ions, are removed by flushing the cell stack with an acidic solution. The acid solutions dissolve and then remove the metallic ions. $HC_2H_2ClO_2$, HF, $HNO_3$, $HNO_2$, and other nitrates, $HC_2H_3O_2$, $[Al(H_2O)_6]^{3+}$, HOCl, HCN, $NH_4^+$, and $HOC_6H_5$. The pH of the acidic solutions can be varied, depending on the degree of contamination and the tolerance of the cells. Metallic contaminants can also be removed by flushing the cells with a solution that includes a chelating agent, such as etliylenedlamene, ethylenediamenetetraacetic acid (EDTA), diethylenetriaminepentacetic acid (DTPA), vitamin B-12 (chelates cobalt), dimercaprol (chelates heavy metals), O-Trensox (chelates both $Fe^{2+}$ and $Fe^{3+}$), and porphyrins, such as heme (chelates iron).

Sulfur based contaminants, such as $SO_x$, are removed, e.g., using an alkaline solution. Possible bases include NaOH, KOH, LiOH, RbOH, CsOH, $Ca(OH)_2$, $Ba(OH)_2$, $Sr(OH)_2$, $NH_3$, $CH_3NH_2$, $C_2H_5NH_2$, $C_6H_5NH_2$, and $C_5H_5N$. Alkaline solutions can also be used to remove some metallic ions, and some nitrates. For example, slaked lime, $Ca(OH)_2$, removes metallic ions, such as $Ca^{2+}$ and $Mg^{2+}$. As with the acidic solutions, the pH of the alkaline solutions can be varied, depending on the degree of contamination and the tolerance of the cells.

Most organic contaminants are removed by flushing the cells with a strong oxidant. The oxidant removes the organic compounds by, e.g., oxidizing and dissolving the compounds. Examples of possible oxidants include peroxides, ozone, ozonated water, and organic solvents, such as methanol and other alcohols, ethers, acetone, and chloroform. Other types of electron donors, such as dilute fluorine gas or an NaF solution, can also remove contaminants. Glycol solutions are also possible.

Many compounds, including metallics and some organics, can also be removed, to some degree, by flushing the cells with deionized water, as demonstrated by the experiment described above. Other flushing solutions are also possible, and are within the scope of the invention.

To flush a solution or a gas through a fuel cell stack to remove contaminants, the removal substance is passed through the same paths as the reformate and the ambient air.

For example, to flush a removal substance through the anode side of fuel cells 18 in fuel cell stack 10, the substance is passed into entrance 21a of the stack. The substance then passes through manifold 20a, through flow plate inlets 34, and into the anode side flow plates 30 of cells 18. The substance then passes through serpentine channels 38 of flow plates 30, at times passing into anode side gas diffusion layers, and exits the flow plates through outlets 36. The substance, and the contaminants it has collected, then exit stack 10 through exit manifold 23a.

The removal substance can also be passed through the cathode sides of cells 18 in stack 10 by passing the substance into opening 21b of manifold 20b. To pass a removal substance through an individual fuel cell that is not part of a stack, the removal substance can be passed directly into the inlets of the cell's flow plate.

Alternatively, the removal substances can be passed through a cell or a cell stack in reverse. In this reverse flush embodiment, the "inlet" for the removal substance would be, e.g., exits 23a, 23b of discharge manifolds 22a, 22b, or outlets 36 of a flow plate.

For each flush using a liquid removal substance, the amount of solution passed through a fuel cell stack is preferably greater than the volume of stack space available for liquid, e.g., between three and five times the available volume. For flushes using gases, the fuel cell stack is preferably exposed for, e.g., about 15 minutes to an hour. The volumes of liquids and gasses used to flush the stack can vary, depending on the degree of contamination, the time available for decontamination, and the nature of the flushing solution or gas.

In one embodiment, a fuel cell stack is decontaminated using a series of flushes. First, the stack is flushed with water, e.g., deionized water, or alternatively, a water-acetone solution. Other wash solutions can also be used. The discharge is collected and analyzed to determine the contaminants present. Possible analysis methods include chromatography (e.g., gas, paper, or column chromatography), mass spectrometry, and simple chemical tests. After determining the contaminants present, flush gasses and solutions are selected and used to remove the contaminants. For example, if the analysis of the water flush determines that metallics and organic compounds are present in the stack, the stack is first flushed, e.g., with an acid solution, and then flushed, e.g., with an organic solvent. If the analysis detects additional compounds, such as $SO_x$, an alkaline solution flush can be used either before or after the acid solution.

Between each removal substance flush, the stack is flushed with water to clear out the previous flush substance. The discharge from the intermediate water flushes can be collected and analyzed to determine the effectiveness of the preceding flush. If necessary, the preceding flush can be repeated, or an alternative flush can be used. For example, if analysis of a water flush following an acid flush finds that divalent metallic cations are still present, the acid flush can be repeated, or an EDTA solution flush might be attempted instead.

The series of decontamination flushes can be repeated on a regular basis. For example, for fuel cell stacks located in residential homes or office buildings, a service company can visit the stack on a periodic basis, e.g., once or twice per year. The service company would perform, e.g., a water or water-acetone flush to analyze the stack, and then, if necessary, decontaminate. In addition, stack owners could purchase kits for analyzing or decontaminating stacks, and perform the procedure themselves.

The decontamination procedures described above can be used for fuel cells other than PEM cells, and for cell stacks in locations other than buildings. For example, the above methods could be used to decontaminate fuel cells in vehicles, such as busses and automobiles.

Other embodiments are within the scope of the claims.

What is claimed is:

1. A method of removing a contaminant from a fuel cell that has a reactant flow channel with an inlet in fluid communication with the reactant flow channel, the method comprising:

passing a liquid removal substance into the inlet of the reactant flow channel and through the flow channel to remove the contaminant, wherein the contaminant is selected from the group consisting of a metallic ion, $SO_x$, $NO_x$, and an organic molecule.

2. The method of claim 1, wherein the contaminant is a metallic ion, and the substance is selected from the group consisting of an acidic solution and a chelating agent.

3. The method of claim 1, wherein the contaminant is an organic molecule, and the substance is an oxidant.

4. The method of claim 3, wherein the substance is selected from the group consisting of an organic solvent, a peroxide, ozone, and ozonated water.

5. The method of claim 1, wherein the contaminant is $SO_x$, and the substance is an alkaline solution.

6. The method of claim 1, wherein the reactant flow channel further includes a reactant flow channel outlet, the reactant flow channel inlet and the reactant flow channel outlet being connected by the reactant flow chartel, and the passing step includes passing the substance through the reactant flow channel outlet.

7. The method of claim 6, wherein the fuel cell includes a plurality of reactant flow channels, each reactant flow channel having reactant flow channel inlet and a reactant flow channel outlet, and the passing step includes passing the substance through each reactant flow channel inlet.

8. The method of claim 1, wherein the substance comprises a wash solution.

9. The method of claim 8, wherein the wash solution is selected from the group consisting of water and a water-acetone solution.

10. The method of claim 6, wherein the contaminant is selected from the group consisting of a metallic ion, $SO_x$, $NO_x$, and an organic molecule.

11. The method of claim 6, wherein the contaminant is a metallic ion, and the substance is selected from the group consisting of an acidic solution and a chelating agent.

12. The method of claim 6, wherein the contaminant is an organic molecule, and the substance is an oxidant.

13. The method of claim 12, wherein the substance is selected from the group consisting of an organic solvent, a peroxide, ozone, and ozonated water.

14. The method of claim 6, wherein the contaminant is $SO_x$, and the substance is an alkaline solution.

15. The method of claim 6, wherein the substance comprises a wash solution.

16. The method of claim 15, wherein the wash solution is selected from the group consisting of water and a water-acetone solution.

17. The method of claim 7, wherein the contaminant is selected from the group consisting of a metallic ion, $SO_x$, $NO_x$, and an organic molecule.

18. The method of claim 7, wherein the contaminant is a metallic ion, and the substance is selected from the group consisting of an acidic solution and a chelating agent.

19. The method of claim 7, wherein the contaminant is an organic molecule, and the substance is an oxidant.

20. The method of claim 19, wherein the substance is selected from the group consisting of an organic solvent, a peroxide, ozone, and ozonated water.

21. The method of claim 7, wherein the contaminant is $SO_x$, and the substance is an alkaline solution.

22. The method of claim 7, wherein the substance comprises a wash solution.

* * * * *